United States Patent
Na (10) Patent No.: US 8,044,978 B2
(45) Date of Patent: Oct. 25, 2011

(54) IMAGE DISPLAY APPARATUS AND HIGH QUALITY IMAGE PROVIDING METHOD THEREOF

(75) Inventor: Hong-ju Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1277 days.

(21) Appl. No.: 11/710,570

(22) Filed: Feb. 26, 2007

(65) Prior Publication Data

US 2008/0037866 A1    Feb. 14, 2008

(30) Foreign Application Priority Data

Aug. 9, 2006  (KR) .......................... 10-2006-0075382

(51) Int. Cl.
*G09G 5/10*    (2006.01)
(52) U.S. Cl. ...................................................... 345/690
(58) Field of Classification Search .................... 345/690
See application file for complete search history.

(56) References Cited

U.S. PATENT DOCUMENTS

| | | | |
|---|---|---|---|
| 6,674,429 B1 * | 1/2004 | Correa et al. | 345/211 |
| 7,023,406 B1 * | 4/2006 | Nunomura et al. | 345/63 |
| 7,369,183 B2 * | 5/2008 | Oka et al. | 348/674 |
| 2003/0164810 A1 * | 9/2003 | Kim | 345/63 |
| 2004/0061709 A1 * | 4/2004 | Park et al. | 345/690 |
| 2005/0190121 A1 * | 9/2005 | An | 345/60 |

FOREIGN PATENT DOCUMENTS

| | | | |
|---|---|---|---|
| EP | 1026655 A1 | | 8/2000 |
| EP | 1345201 A2 | | 9/2003 |
| EP | 1 400 947 A | | 3/2004 |
| EP | 1 560 192 A | | 8/2005 |
| GB | 2 418 316 A | | 3/2006 |
| JP | 8-317250 A | | 11/1996 |
| JP | 08317250 A | * | 11/1996 |
| KR | 10-2005-0063395 A | | 6/2005 |

* cited by examiner

*Primary Examiner* — Richard Hjerpe
*Assistant Examiner* — Carolyn R Edwards
(74) *Attorney, Agent, or Firm* — Sughrue Mion, PLLC (57) ABSTRACT

An image display apparatus and a method of providing a high quality image are provided. The image display apparatus includes an image signal processing unit which analyzes an input image signal and outputs an average picture level (APL) and histogram information of one frame; and a controlling unit which calculates contrast control information and average signal level (ASL) information corresponding to the APL and the histogram information. The image signal processing unit enhances the contrast of the input image signal based on the contrast control information output from the controlling unit, and outputs a resulting image signal. Accordingly, a high quality image can be provided to users.

14 Claims, 12 Drawing Sheets

IMAGE DISPLAY APPARATUS AND HIGH QUALITY IMAGE PROVIDING METHOD THEREOF

CROSS-REFERENCE TO RELATED APPLICATIONS

This application claims priority from Korean Patent Application No. 10-2006-0075382, filed on Aug. 9, 2006 in the Korean Intellectual Property Office, the entire disclosure of which is hereby incorporated by reference.

BACKGROUND OF THE INVENTION

1. Field of the Invention

Apparatuses and methods consistent with the present invention relate to an image display apparatus and a method of providing a high quality image, and more particularly, to an image display apparatus which analyzes characteristics of an input image signal and dynamically processes the signal based on the analysis to provide a high quality image display.

2. Description of the Related Art

Use of an image display apparatus, such as a cathode ray tube (CRT), a liquid crystal display (LCD), a plasma display panel (PDP), and a digital light processing (DLP), has been increasing. Accordingly, a greater enhanced image quality of the image display apparatus is necessary. In order to meet such demands, various suggestions to enhance image quality have been made.

Each type of image display apparatus has its own display characteristics to output an optimum image. For example, PDP displays images digitally, so they have different gradation values depending on the size of the digital data. The method of displaying through the PDP will be briefly explained below with reference to FIGS. 1 and 2.

Figure 1:
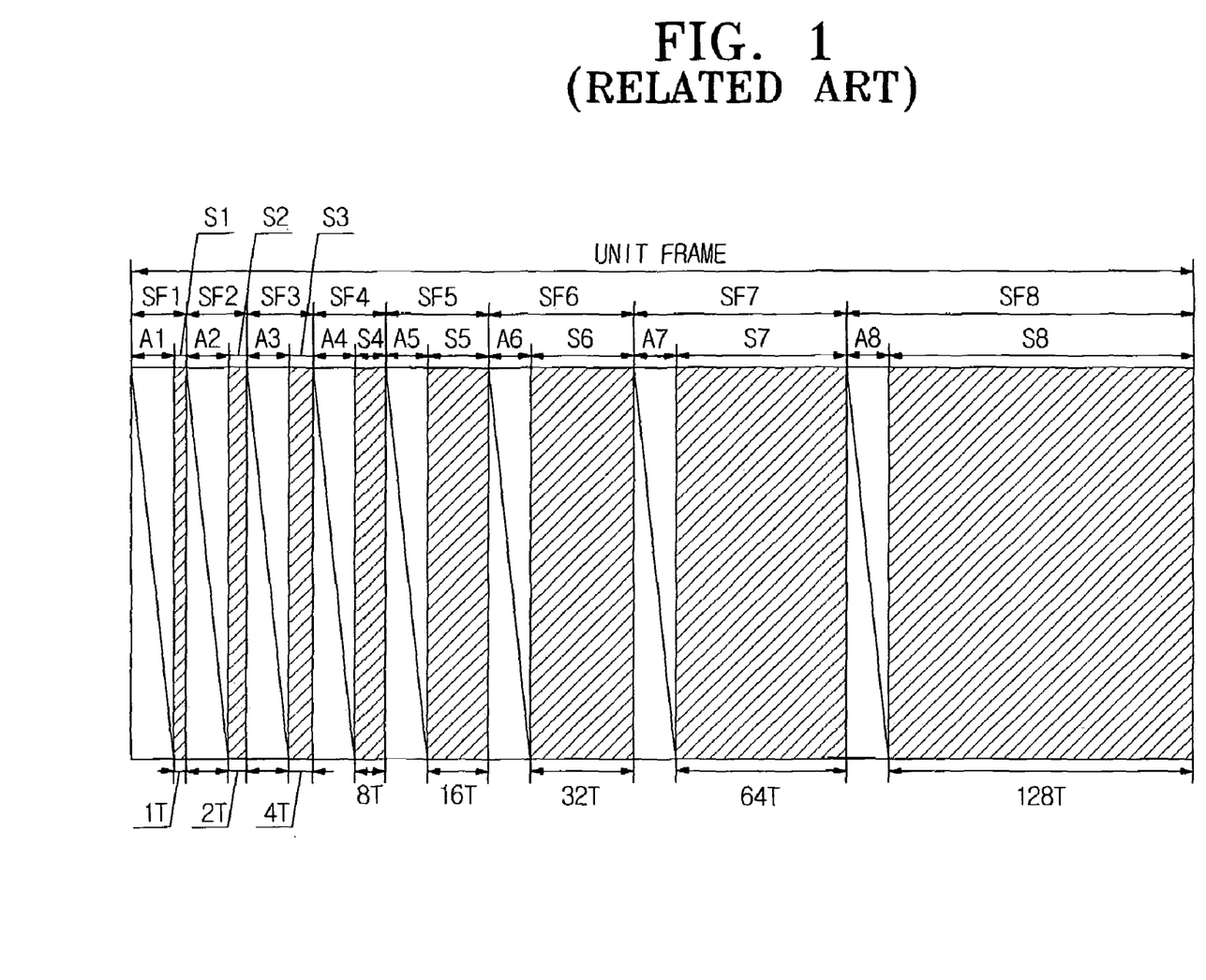
FIG. 1 illustrates a method of displaying of a related art image display apparatus.

FIG. 1 illustrates a display method of a related art image display apparatus.

FIG. 1 shows an example where a unit frame constituting a screen is time-divided into eight sub-fields SF1, SF2, . . . , SF8. Each of the sub-fields SF1, SF2, . . . , SF8 is divided into reset regions (not shown), address regions A1, A2, . . . , A8, and sustain regions S1, S2, . . . , S8.

Cells are set to an initial state in the reset regions, and turning cells on or off is determined based on the display data in the address regions A1, A2, . . . , A8. Also, for cells to turn on, the display discharge is shown in the sustain regions S1, S2, . . . , S8 so that image is displayed through the screen.

The illuminating periods 1T, 2T, . . . , 128T of the sustain regions S1, S2, . . . , S8 are formed at a proportion of 1:2:4:8:16:32:64:128. By selecting an appropriate sub-field to display from the eight sub-fields SF1, SF2, . . . , SF8, any sub-field can realize 256 gradations, including the zero gradation, which does not have display discharge.

Sustain pulses are supplied to the scan electrode and the sustain electrode of the panel in turn in the sustain regions S1, S2, . . . , S8, in order to generate a display discharge. The contrast varies depending on the number of sustain pulses supplied in the same sustain region S1, S2, . . . , S8. Therefore, the number of sustain pulses can be adjusted based on the average picture level (APL) of the input image signal (FIG. 2).

Figure 2:
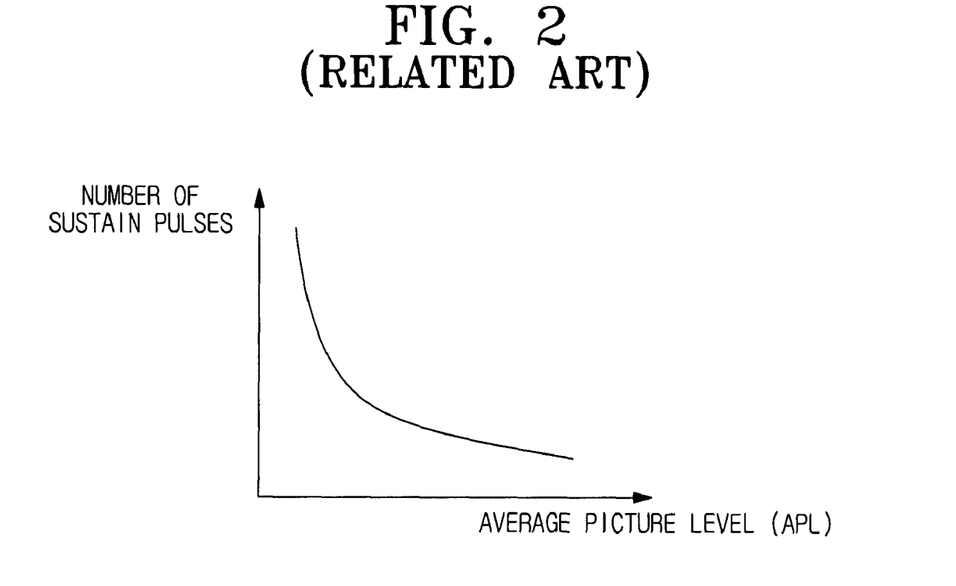
FIG. 2 is a graphical representation of the number of sustain pulses of a related art image display apparatus as a function of the APL.
Figure 3A:
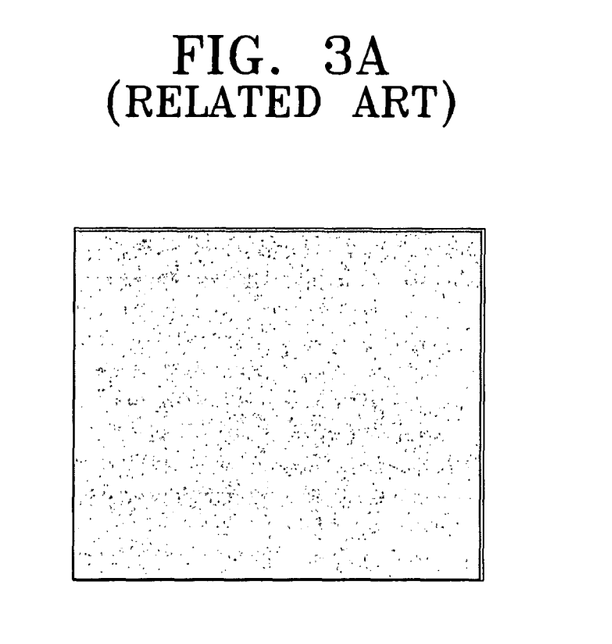
FIGS. 3A and 3B illustrate examples of images with the same APL displayed in the related art image display apparatus.
Figure 3B:
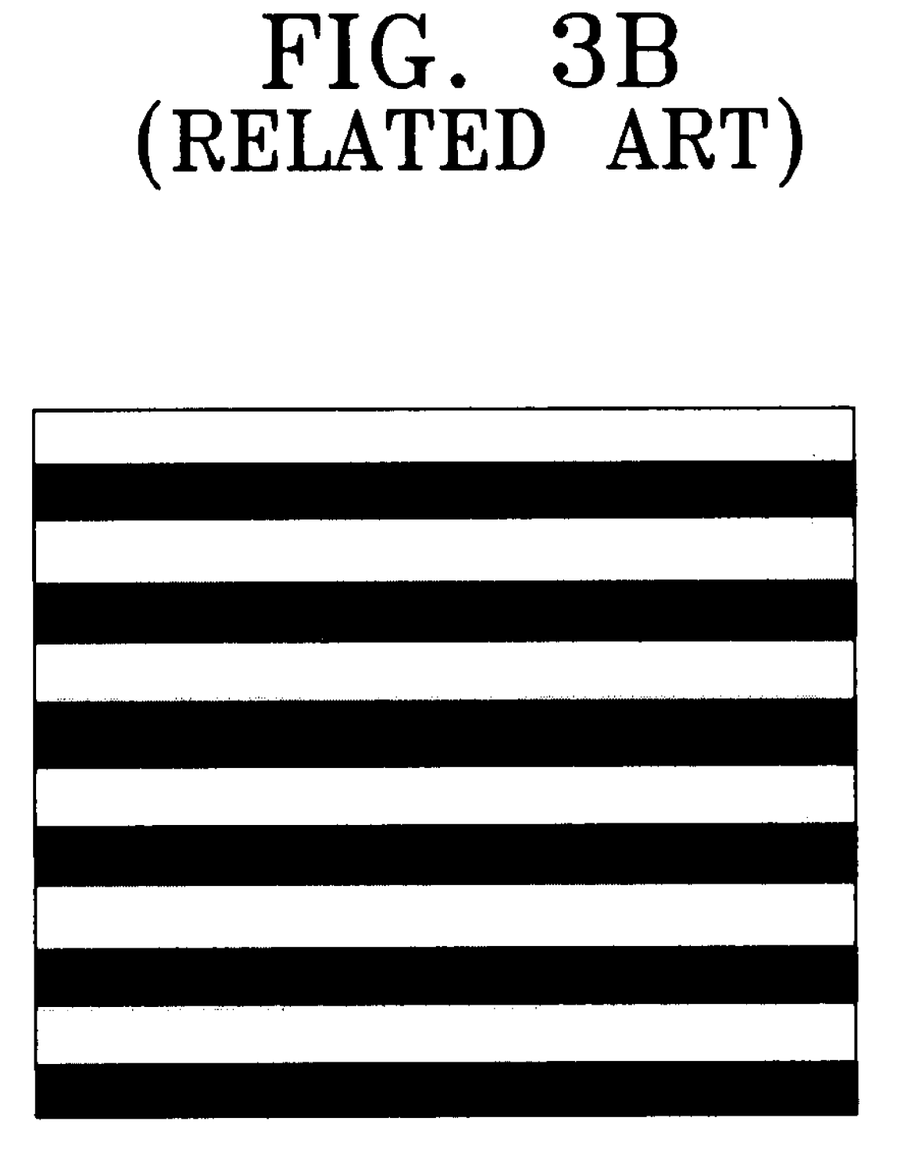

FIG. 2 is a graphical representation of the number of sustain pulses as a function of the APL in a related art image display apparatus. FIGS. 3A and 3B show images having the same APL displayed through the related art image display apparatus.

Referring to FIG. 2, the number of sustain pulses is increased to improve contrast when the screen is relatively dark due to a low APL. On the contrary, the number of sustain pulses is decreased to reduce power consumption when the APL is high and the screen is relatively bright. Automatic power control (APC) can be achieved by maintaining the power consumption at a constant level, regardless of the contrast of the screen.

However, when the APL of the input image signals is same, the same number of sustain pulses is supplied. FIGS. 3A and 3B show an example of inputting different types of image signals having the same APL, in which the same number of sustain pulses is supplied. The image display apparatus displaying the resultant pattern as shown in FIG. 3B needs relatively large power consumption, and the driving board is under stress. Additionally, the image with high contrast is saturated on the screen, and the image quality degrades.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image display apparatus and method which provide a high quality image and prevent excessive power consumption and stress to the driving board by adjusting the number of sustain pulses based on the APL and the distribution of the input image signal.

The present invention also provides a high quality image, by controlling contrast enhancement based on not only the APL, but also the distribution of the input image signal, and a high quality image providing method thereof.

According to an aspect of the present invention, there is provided an image display apparatus which comprises an image signal processing unit which analyzes an input image signal and outputs an APL and histogram information of one frame; and a controlling unit which calculates contrast control information and average signal level (ASL) information corresponding to the APL and the histogram information, wherein the image signal processing unit enhances the contrast of the input image signal based on the contrast control information output from the controlling unit and outputs a resulting image signal.

A memory is further provided, which stores a plurality of transform functions to control contrast enhancement (CE) of the input image signal, wherein the controlling unit selects one transform function from the plurality of transform functions which corresponds to the APL of the input image signal, varies the selected transform function based on the histogram information, and outputs the varied transform function as the contrast control information.

The controlling unit varies the transform function by adjusting at least one factor based on the histogram information, and the factor determines the shape of the transform function.

A module controlling unit may be further provided, which adjusts address data received at an address electrode of a plasma type display module based on the image signal output from the image signal processing unit.

The controlling unit calculates the ASL information by changing a weight corresponding to the APL based on the histogram information, and multiplying the result by the APL.

A memory may be further provided, which stores the ASL corresponding to a frame prior to the input image signal, wherein the controlling unit calculates the ASL information corresponding to the current frame by multiplying the calculated ASL information by the ASL corresponding to the prior frame.

A sustain controlling unit may be further provided, which adjusts a number of sustain pulses received at a sustain electrode of a plasma type display module based on the ASL information.

According to another aspect of the present invention, a method of providing a high quality image is provided, which comprises analyzing an input image signal and outputting an APL and histogram information of one frame; calculating contrast control information and ASL information corresponding to the APL and the histogram information; and enhancing the contrast of the input image signal based on the contrast control information output from the controlling unit, and outputting a resulting image signal.

The calculating of the contrast control information comprises selecting one transform function from the plurality of transform functions to control contrast enhancement of the input image signal which corresponds to the APL of the input image signal, varying the selected transform function based on the histogram information, and outputting the varied transform function as the contrast control information.

The varying the transform function and outputting the contrast control information comprises adjusting at least one factor based on the histogram information, wherein the factor determines the shape of the transform function.

Adjusting address data received at an address electrode of a plasma type display module based on the resulting image signal may be further provided.

The calculating of the ASL comprises changing a weight corresponding to the APL based on the histogram information, and multiplying the result by the APL.

The calculating of the ASL corresponding to the current frame comprises multiplying the calculated ASL information by the ASL corresponding to a prior frame.

Adjusting the number of sustain pulses received at a sustain electrode of a plasma type display module based on the ASL information may be further provided.

BRIEF DESCRIPTION OF THE DRAWINGS

The above and other aspects of the present invention will be more apparent from the following description of exemplary embodiments, taken in conjunction with the accompanying drawings, in which.

DETAILED DESCRIPTION OF EXEMPLARY EMBODIMENTS OF THE INVENTION

The matters defined in the description, such as a detailed construction and elements, are provided to assist in a comprehensive understanding of exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness. Throughout the drawings, the same reference numerals will be understood to refer to the same elements, features, and structures.

Figure 4:
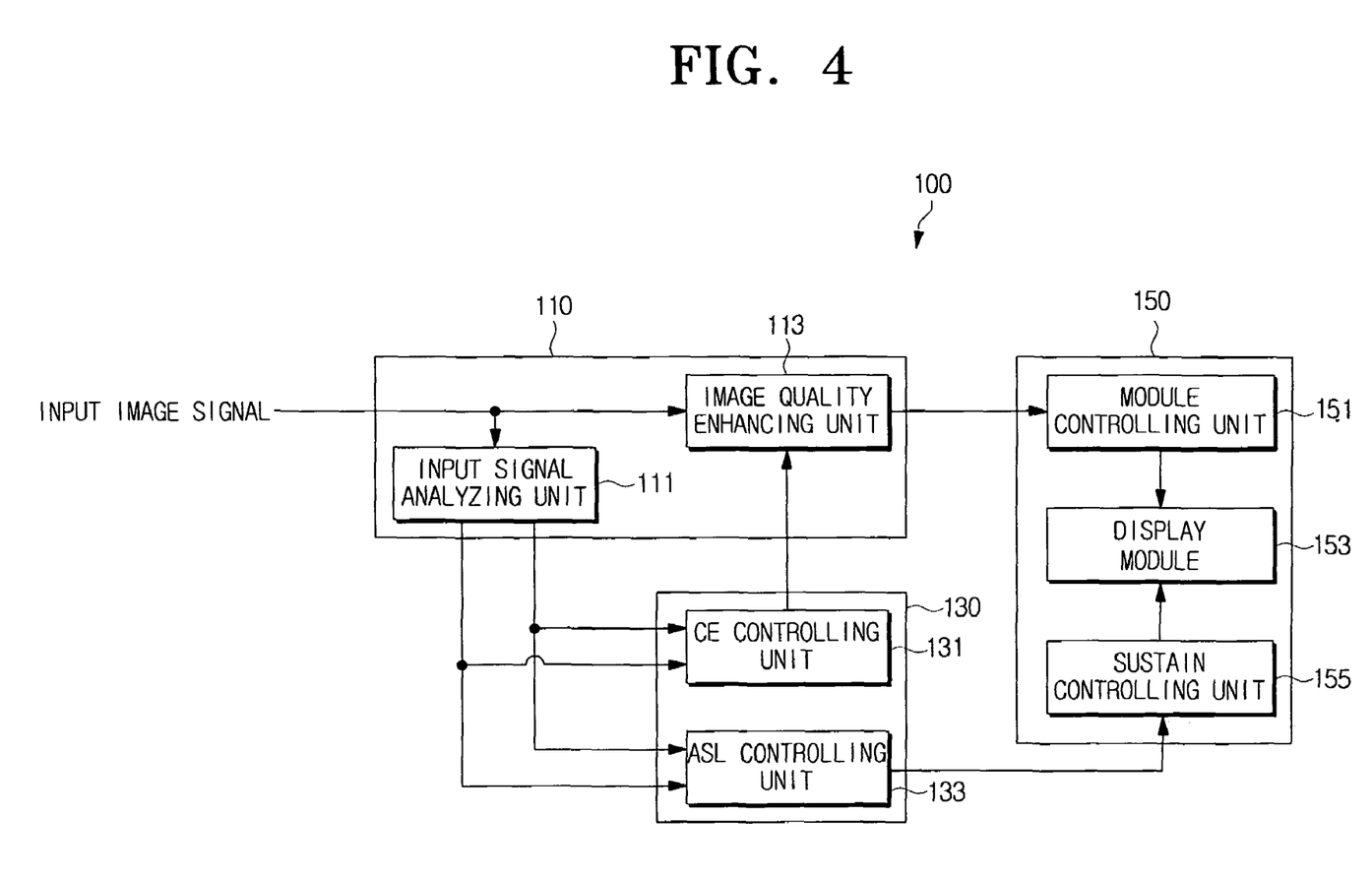
FIG. 4 is a schematic block diagram of an image display apparatus according to an exemplary embodiment of the present invention.

FIG. 4 is a block diagram of an image display apparatus based on an exemplary embodiment of the present invention.

Referring to FIG. 4, the image display apparatus 100 based on an exemplary embodiment of the present invention includes an image signal processing unit 110, a main controlling unit 130, and a display unit 150.

The image signal processing unit 110 includes an input signal analyzing unit 111 which detects a contrast value of each frame included in the input image signal, and outputs an APL and histogram information of image signal of one frame, based on the detected contrast value. Additionally, the image signal processing unit 110 may include an image quality enhancing unit 113 which carries out noise estimation with respect to the input image signal, and carries out contrast enhancement (CE) using the contrast control information output from the main controlling unit 130.

The main controlling unit 130 may include a CE controlling unit 131 which outputs the contrast control information for contrast enhancement, using the APL and the histogram information output from the image signal processing unit 110. The main controlling unit 130 may include a memory (not shown) which stores a plurality of transform functions, such that the CE controlling unit 131 selects a transform function corresponding to the APL from the memory, transforms using the histogram information, and outputs the contrast control information.

Additionally, the main controlling unit 130 may include an ASL controlling unit 133 which outputs the ASL for the adjustment of number of sustain pulses, using the APL and the histogram information. The main controlling unit 130 may include a memory (not shown) to store the ASL information of the previous frame. The ASL controlling unit 133 multiplies the ASL of the current frame by the ASL of the previous frame to output a final ASL.

The display unit 150 may include a display module 153 which displays an image signal through the screen, a module controlling unit 151 which controls the module such that the image signal having enhanced quality by CE is received and displayed through the screen, and a sustain controlling unit 155 which controls the number of sustain pulses using the ASL information. The display module 153 may be implemented as a PDP, the module controlling unit 151 controls the address data received at the address electrode of the PDP, and the sustain controlling unit 155 adjusts the number of sustain pulses received at the sustain electrode of the PDP.

The operation of the image display apparatus 100 will be explained in greater detail with reference to the following examples.

Figure 5A:
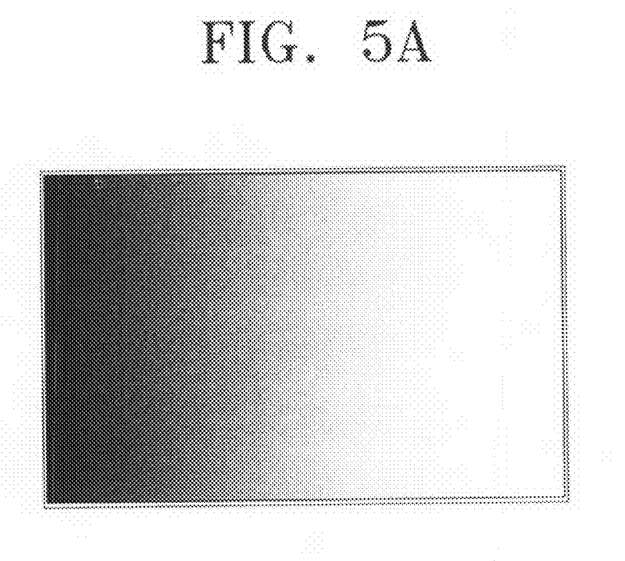
FIGS. 5A to 5C are views showing examples of the pattern input to an image display apparatus according to an exemplary embodiment of the present invention.
Figure 5B:
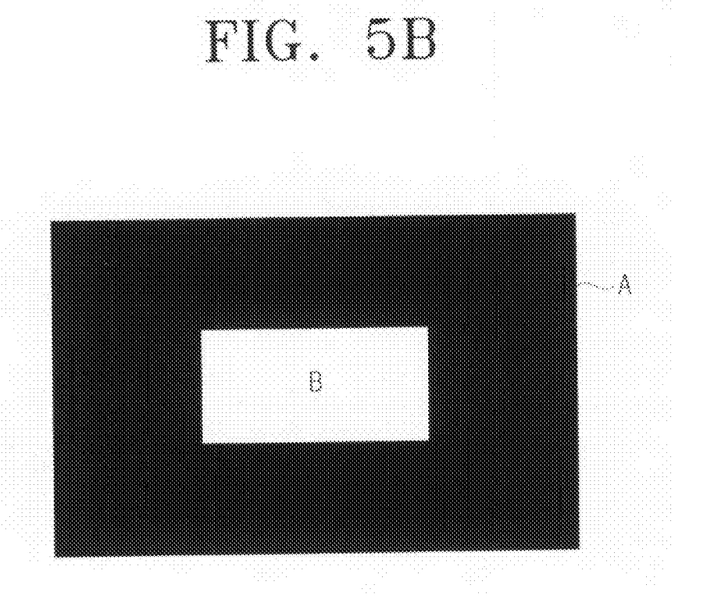
Figure 5C:
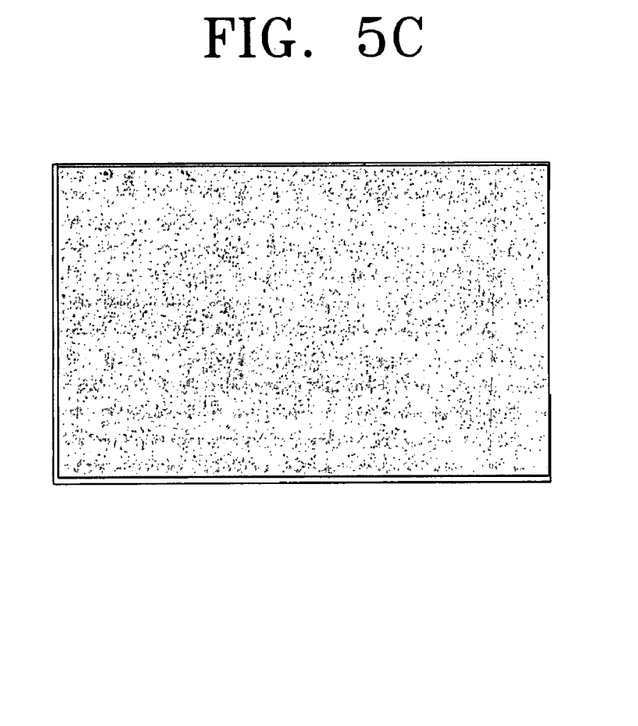
Figure 6A:
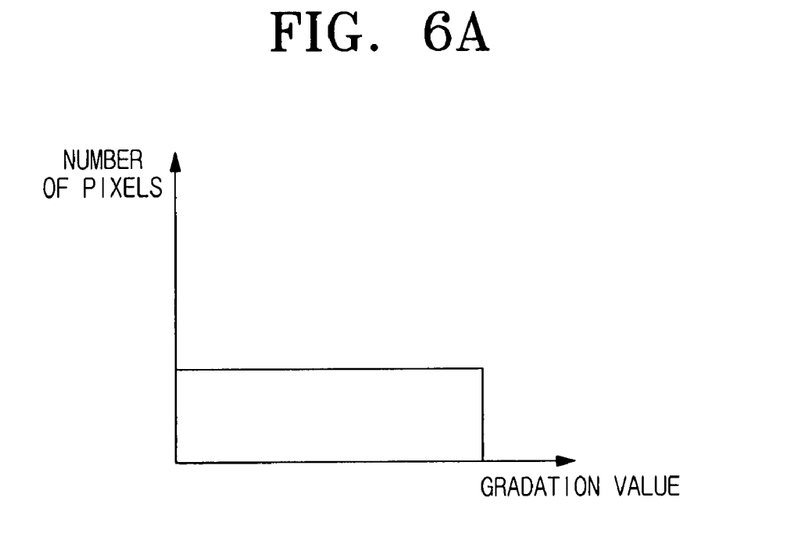
FIGS. 6A to 6C show histograms to indicate the distribution of the image signals illustrated in FIGS. 5A to 5C, respectively.
Figure 6B:
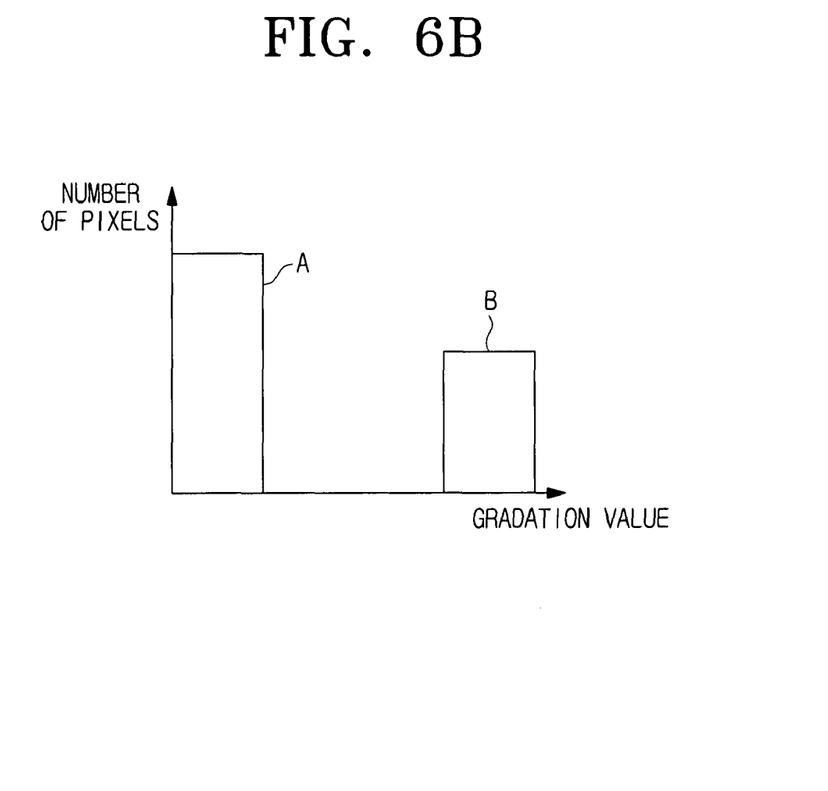
Figure 6C:
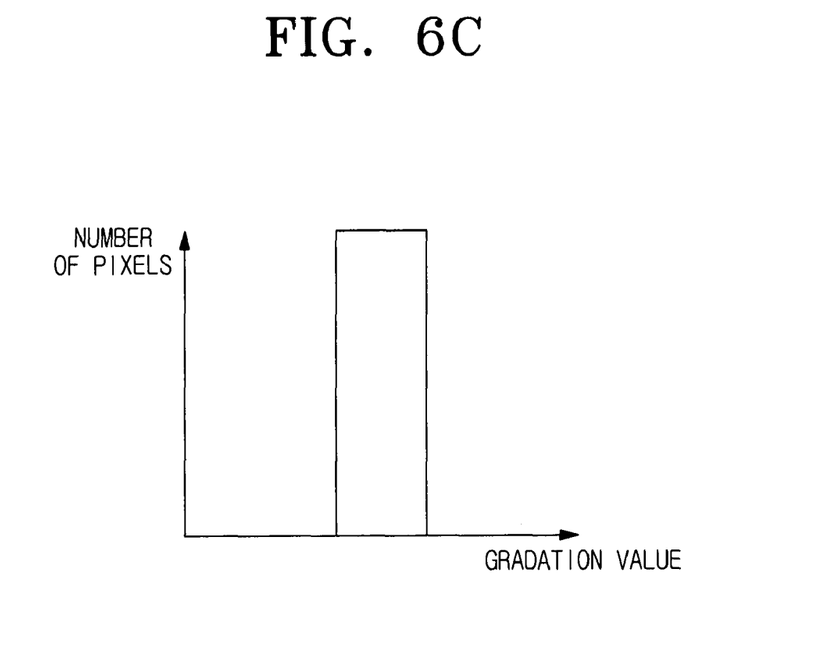

FIGS. 5A to 5C show examples of patterns input to the image display apparatus according to an exemplary embodiment of the present invention, and FIGS. 6A to 6C show histograms to indicate the distribution of the image signals as illustrated in FIGS. 5A to 5C, respectively.

The first, second, and third patterns of FIGS. 5A, 5B, and 5C, respectively, each have the same APL, and different distributions of the input image signal, as illustrated in the histograms of FIGS. 6A to 6C. In FIGS. 6A to 6C, the horizontal axis of the histograms represents gradation value, while the longitudinal axis represents the number of corresponding pixels. Therefore, the histograms of FIGS. 6A to 6C represent the density distribution of the input image signal.

In the first pattern, each gradation value from 1 to 255 corresponds to the same number of pixels. The second pattern has a rectangle A of low gradation values, and a rectangle B of high gradation values. The third pattern has a rectangle of median gradation values, and thus has the highest number of pixels that have the median gradation values.

When the input signal analyzing unit 111 analyzes the input image signal and outputs the APL and the histogram information, the CE controlling unit 131 controls the CE of the input image signal, using the APL and the histogram information shown in FIGS. 6A to 6C. This will be explained in detail with reference to FIGS. 7A to 7C.

Figure 7A:
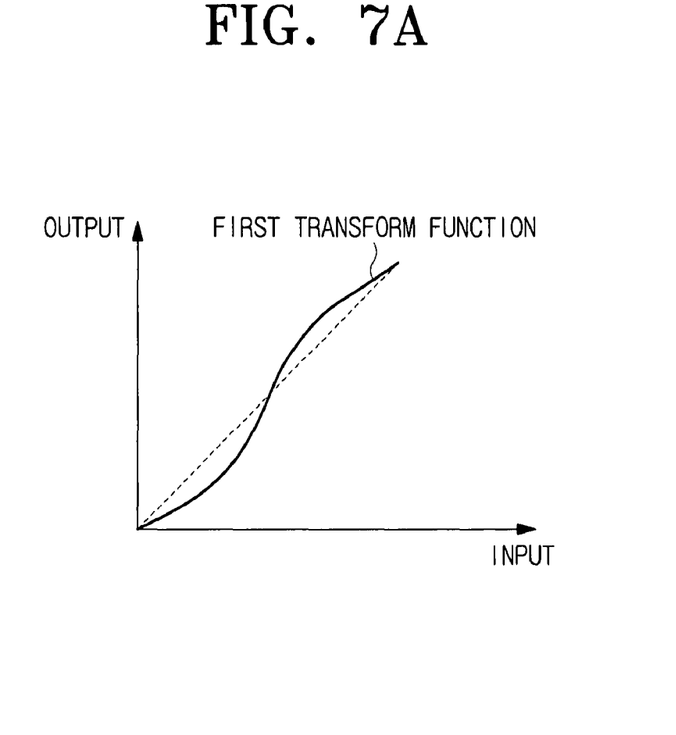
FIGS. 7A to 7C are graphical representations of transform function used to control the contrast enhancement of an image display apparatus according to an exemplary embodiment of the present invention.
Figure 7B:
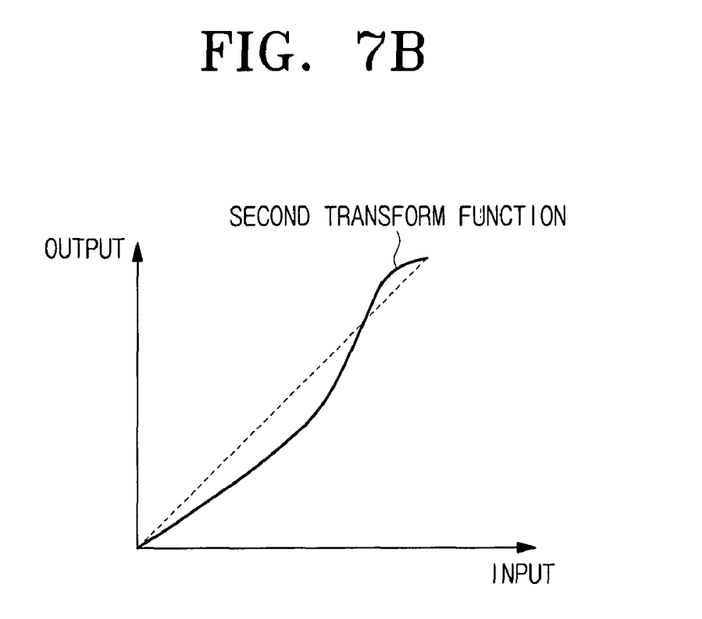
Figure 7C:
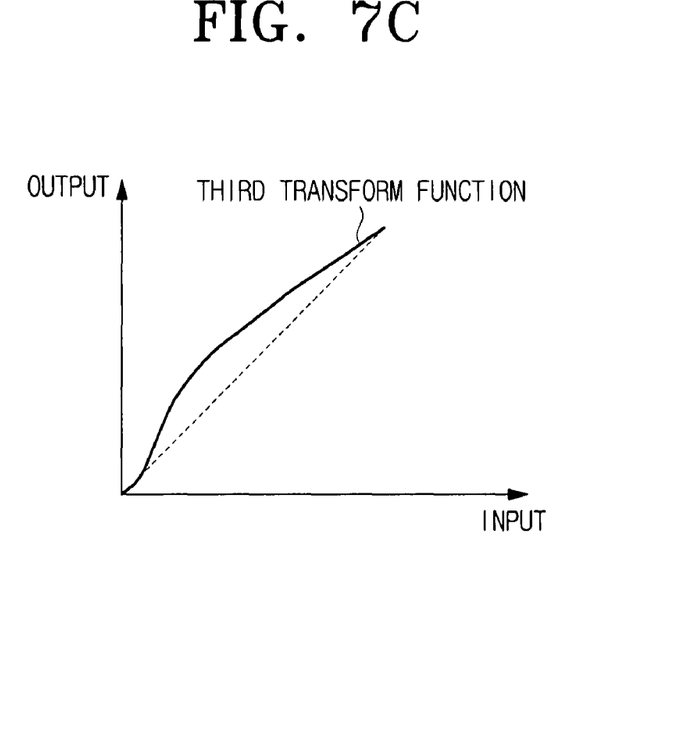

FIGS. 7A to 7C are graphical representation of transform functions that are used to control the CE of an image display apparatus based on an exemplary embodiment of the present invention.

As shown in FIGS. 7A to 7C, the transform function for CE control varies, depending on the histogram information of the input image signal. The CE controlling unit 131 selects one among the pre-stored transform functions of the memory (not shown) thereof that corresponds to the APL of the input image signal. The transform function corresponds to a gamma curve that determines the output of the input image signal, and the shape of the curve is determined in accordance with various factors.

The factors that determine the shape of the transform function include low gain and high gain which determine the degree of bending of the curve; offset which determines upper and lower limits of the graph; slope which determines the inclination of the graph; and threshold which determines the boundary between the concave and convex parts of the graph.

The factors are predetermined to correspond to an APL of 0 to 255, and stored in the memory of the CE controlling unit 131. The CE controlling unit 131 selects factors corresponding to the APL output from the input signal analyzing unit 111, and adjusts the size of the factors based on the histogram information output from the input signal analyzing unit 111. The graph as adjusted becomes the transform function to be used as the contrast control information.

The CE controlling unit 131 applies the distribution characteristic of the input image signal to the selected transform function, and provides the image quality enhancing unit 113 with the contrast control information. In other words, the CE controlling unit 131 adjusts the size of the factors that determine the shape of the curve of the selected transform function in accordance with the histogram information, and the selected transform function is changed to the first, second, or third transform function and output as the contrast control information.

The image quality enhancing unit 113 carries out CE of the input image signal, using the contrast control information output from the CE controlling unit 131. The image quality enhancing unit 113 then provides the module controlling unit 151 with the image signal of enhanced contrast, and the module controlling unit 151 controls the address electrode of the display module 153 so that the image signal can be displayed through the screen.

Figure 8A:
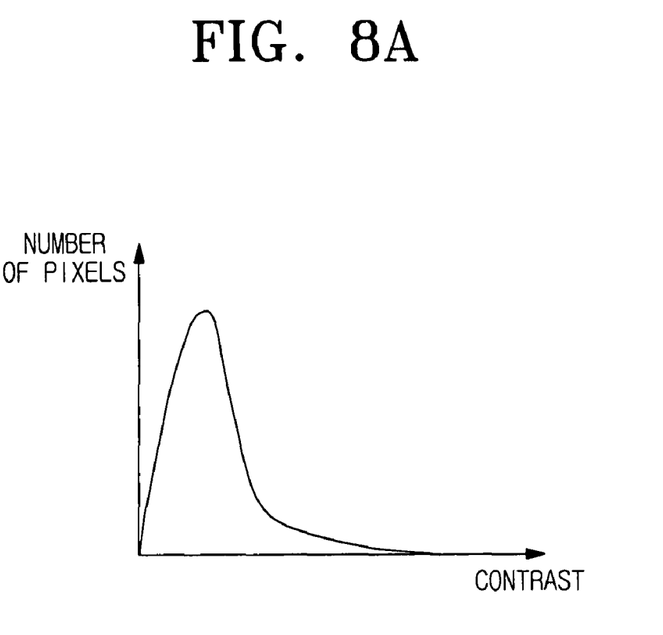
FIGS. 8A to 8C are graphical representations showing the number of pixels as a function of the contrast of the input image signal according to an exemplary embodiment of the present invention.
Figure 8B:
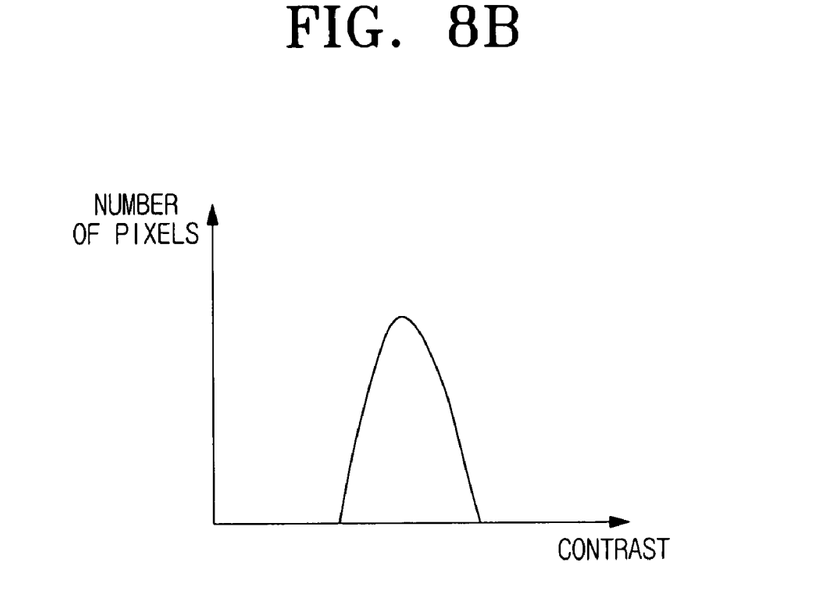
Figure 8C:
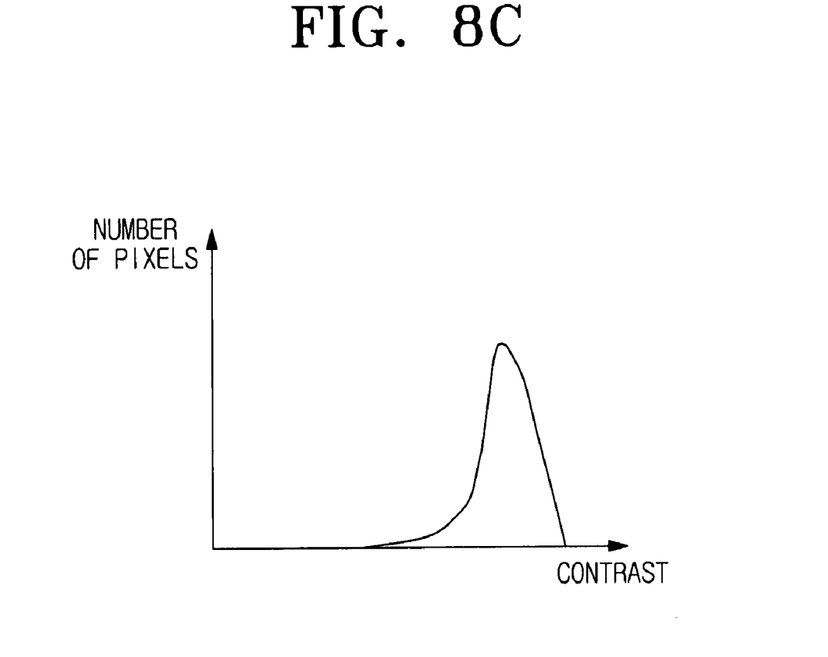

FIGS. 8A to 8C are graphical representations showing the number of pixels as a function of the contrast of the image signal input to an image display apparatus, according to an exemplary embodiment of the present invention.

FIG. 8A shows a dark image having mostly low-contrast pixels, FIG. 8B shows an intermediate image having mostly mid-contrast pixels, and FIG. 8C shows a bright image having mostly high-contrast pixels.

The ASL controlling unit 133 calculates the ASL information based on the APL output from the input signal analyzing unit 111, and provides the sustain controlling unit 155 with the result. More specifically, the ASL controlling unit 133 provides ASL information to increase the contrast of the input image signal when a dark image is input, while providing the ASL information to decrease the contrast of the input image signal when a bright image is input.

The ASL controlling unit 133 calculates the ASL information of the current frame using Equation 1 as follows, when a dark image as shown in FIG. 8A is input:

$$ASL\_new = Y\text{mean} * 0.6 \qquad \text{[Equation 1]}$$

The ASL controlling unit 133 calculates the ASL information of the current frame using Equation 2 as follows, when a mid-contrast image as shown in FIG. 8B is input:

$$ASL\_new = Y\text{mean} * 1.0 \qquad \text{[Equation 2]}$$

The ASL controlling unit 133 calculates the ASL information of the current frame using Equation 3 as follows, when a bright image as shown in FIG. 8C is input:

$$ASL\_new = Y\text{mean} * 1.2 \qquad \text{[Equation 3]}$$

In Equations 1-3, ASL_new denotes the ASL of the current frame, Ymean denotes the APL of the current frame, and 0.6, 1.0, and 1.2 are examples of the weights that are applied to calculate the ASL information. The weights are variable, depending on the histogram information of the input image signal.

In other words, the ASL controlling unit 133 selects a weight corresponding to the ASL of the current frame, varies the size of the selected weight based on the histogram information of the input image signal, multiplies the varied weight by the APL, and thereby calculates the ASL information of the current frame.

The ASL controlling unit 133 multiplies the ASL of the current frame by the ASL of the previous frame to obtain a final ASL, and provides the sustain controlling unit 155 with the result. Accordingly, the sustain controlling unit 155 controls the number of sustain pulses supplied to the sustain electrode, using the lookup table (LUT).

Figure 9:
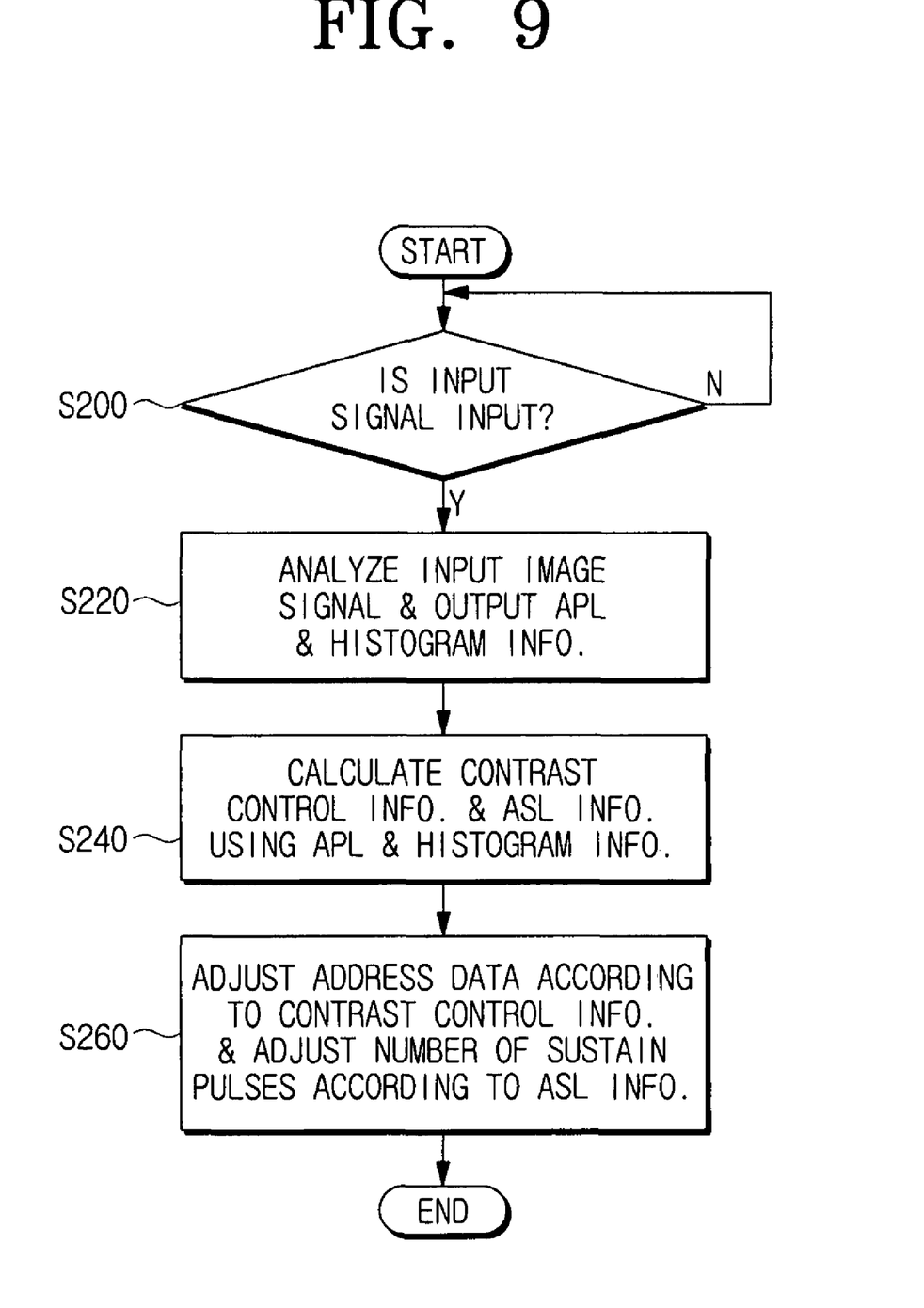
FIG. 9 is a flowchart to illustrate the operation of an image display apparatus according to an exemplary embodiment of the present invention.

FIG. 9 is a flowchart which explains the operation of an image display apparatus based on an exemplary embodiment of the present invention.

Referring to FIG. 9, an image signal is input (S200), the input image signal is analyzed, and the APL and the histogram information are output (S220). More specifically, the input signal analyzing unit 111 detects contrast values of each of the frames of the input image signal, and outputs the APL and the histogram information of the image signal of one frame, using the detected contrast values.

Next, the contrast control information and the ASL information are calculated, using the APL and the histogram information (S240). More specifically, the CE controlling unit 131 calculates a transform function as the contrast control information for use in the CE process, using the APL and the histogram information output from the input signal analyzing unit 111. The ASL controlling unit 133 then calculates the ASL information for use in adjusting the number of sustain pulses.

The address data is then adjusted based on the contrast control information, and the number of sustain pulses is adjusted based on the ASL information (S260). More specifically, the image quality enhancing unit 113 carries out the CE operation of the input image signal using the calculated transform function, and provides the module controlling unit 151 with the image signal of enhanced contrast, and the module controlling unit 151 controls the address data received at the address electrode of the display module 153 accordingly. The sustain controlling unit 155 adjusts the number of sustain pulses received at the sustain electrode of the display module 153, using the ASL information calculated at the ASL controlling unit 133.

As explained above, the image quality can be enhanced and the power consumption can be reduced, using the average contrast and the distribution characteristic of the input image signal.

Figure 10:
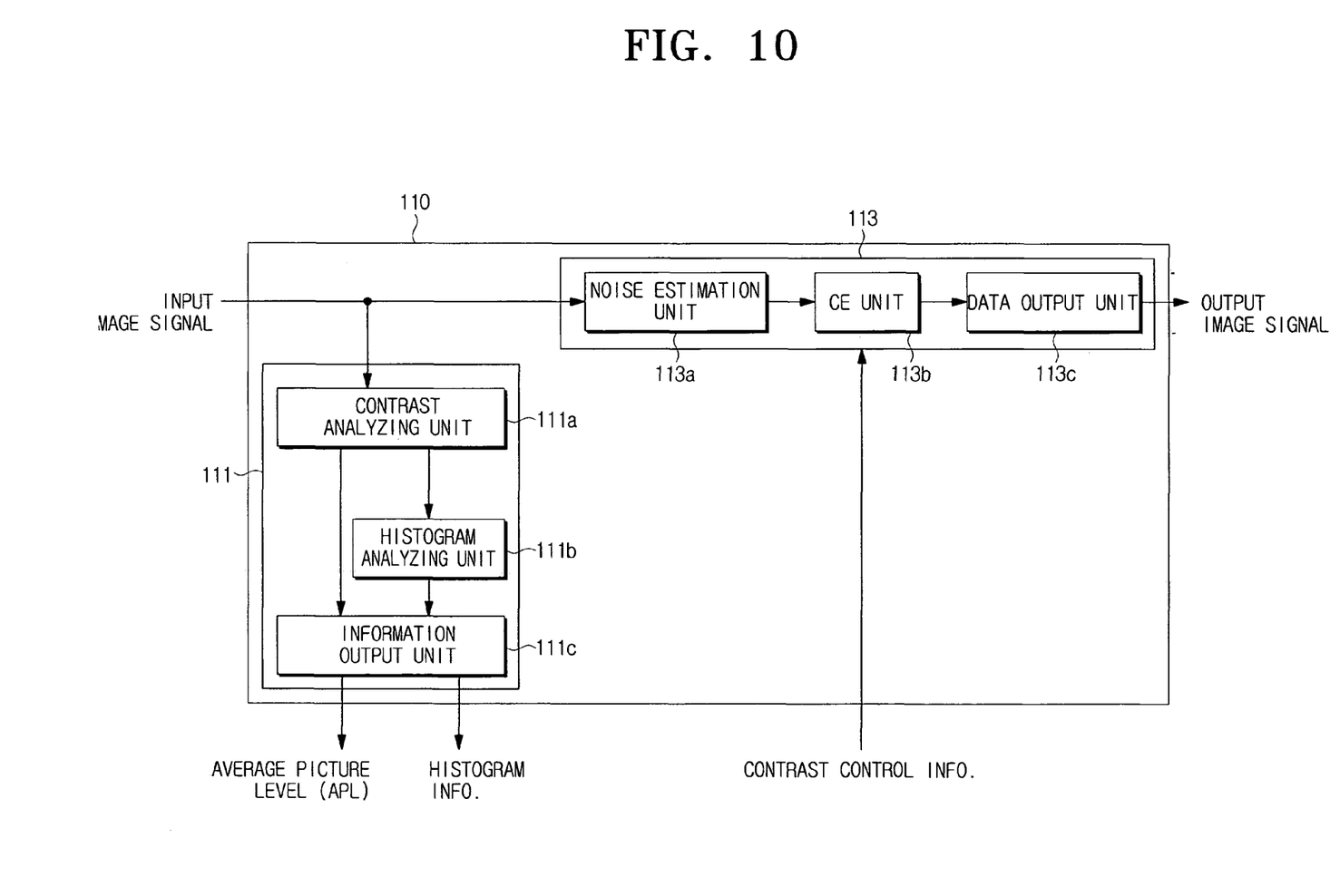
FIG. 10 is a block diagram of the detailed structure of an image signal processing unit of an image display apparatus according to an exemplary embodiment of the present invention.

FIG. 10 is a detailed block diagram of an image signal processing unit of an image display apparatus based on an exemplary embodiment of the present invention.

Referring to FIG. 10, the input signal analyzing unit 111 includes a contrast analyzing unit 111a, a histogram analyzing unit 111b, and an information output unit 111c.

The contrast analyzing unit 111a detects a gradation value corresponding to an RGB pixel of a frame of an input image signal, and analyzes the contrast value of the single frame.

The histogram analyzing unit 111b analyzes the histogram of the distribution of the gradation values of the single frame, using the gradation value of the RGB pixel detected at the contrast analyzing unit 111a.

The information output unit 111c calculates the APL of the single frame based on the result of the analysis of the contrast analyzing unit 111a, calculates histogram information based on the histogram analyzed at the histogram analyzing unit 111b, and outputs the two results.

The image quality enhancing unit 113 includes a noise estimation unit 113a, a CE unit 1113b, and a data output unit 1113c.

The noise estimation unit 113a estimates a noise level corresponding to the amount of noise included in the input image signal, and removes the noise.

The CE unit 113b carries out the CE operation, in accordance with the contrast control information output from the CE controlling unit 131. More specifically, the CE unit 113b re-distributes the gradation values of the RGB pixels of the single frame in accordance with the transform functions, as shown in FIGS. 7A to 7C. The CE unit II 3b also stretches the range of the gray level of the input signal in accordance with the transform function, and outputs the result.

The data output unit 113c converts the image signal output from the CE unit 113b into low voltage differential signaling (LVDS), and outputs to the module controlling unit 151.

As explained above, the image signal processing unit 110 analyzes the input image signal, outputs the APL and the histogram information, and outputs an image signal to be received at the address electrode of the PDP, using the contrast control information output from the main controlling unit 130.

As explained above, according to the exemplary embodiments of the present invention, controlling the number of sustain pulses and enhancing contrast are carried out based on the APL and the distribution characteristic of the input image signal. As a result, power consumption is reduced, stress to the driving board is lessened, and image quality is enhanced.

While the invention has been shown and described with reference to certain exemplary embodiments thereof, it will be understood by those skilled in the art that various changes in form and details may be made therein without departing from the spirit and scope of the invention as defined by the appended claims and their legal equivalents.

What is claimed is:

1. An image display apparatus comprising:
    an image signal processing unit which analyzes an input image signal and outputs an average picture level (APL) and histogram information of one frame; and
    a controlling unit which calculates contrast control information and an average signal level (ASL) information corresponding to the APL and the histogram information, wherein the image signal processing unit enhances a contrast of the input image signal based on the contrast control information output from the controlling unit and outputs a resulting image signal;
    wherein the controlling unit calculates the ASL information by changing a weight corresponding to the APL based on the histogram information, and multiplying a result by the APL.

2. The image display apparatus of claim 1, further comprising a memory which stores a plurality of transform functions to control contrast enhancement (CE) of the input image signal, wherein
    the controlling unit selects a transform function from the plurality of transform functions which corresponds to the APL of the input image signal, varies the selected transform function based on the histogram information, and outputs the varied transform function as the contrast control information.

3. The image display apparatus of claim 2, wherein the controlling unit varies the transform function by adjusting at least one factor based on the histogram information, and the factor determines a shape of the transform function.

4. The image display apparatus of claim 2, further comprising a module controlling unit which adjusts address data received at an address electrode of a plasma type display module based on the resulting image signal output from the image signal processing unit.

5. The image display apparatus of claim 1, further comprising a memory which stores the ASL corresponding to a frame prior to the input image signal, wherein the controlling unit calculates the ASL information corresponding to the current frame by multiplying the calculated ASL information by the ASL corresponding to the frame prior to the input signal.

6. The image display apparatus of claim 1, further comprising a sustain controlling unit which adjusts a number of sustain pulses received at a sustain electrode of a plasma type display module based on the ASL information.

7. A method of providing a high quality image, comprising:
analyzing an input image signal and outputting an average picture level (APL) and histogram information of one frame;
calculating contrast control information and average signal level (ASL) information corresponding to the APL and the histogram information; and
enhancing a contrast of the input image signal based on the contrast control information output from the controlling unit, and outputting a resulting image signal;
wherein the calculating of the ASL information is performed by changing a weight corresponding to the APL based on the histogram information, and multiplying a result by the APL.

8. The method of claim 7, wherein the calculating of the contrast control information comprises selecting a transform function from the plurality of transform functions to control contrast enhancement of the input image signal which corresponds to the APL of the input image signal, varying the selected transform function based on the histogram information, and outputting the varied transform function as the contrast control information.

9. The method of claim 8, wherein the varying the transform function and outputting the contrast control information comprises adjusting at least one factor based on the histogram information, wherein the factor determines a shape of the transform function.

10. The method of claim 8, further comprising adjusting address data received at an address electrode of a plasma type display module based on the resulting image signal.

11. The method of claim 7, wherein the ASL information corresponding to a current frame is calculated by multiplying the calculated ASL information by the ASL corresponding to a prior frame.

12. The method of claim 7, further comprising adjusting a number of sustain pulses received at a sustain electrode of a plasma type display module based on the ASL information.

13. The image display apparatus of claim 1, wherein the controlling unit is configured to calculate the average signal level (ASL) information using the APL and the histogram information.

14. The image display apparatus of claim 1, wherein the controlling unit is configured to calculate the contrast control information and the average signal level (ASL) information for the one frame,
wherein the image signal processing unit enhances a contrast of the one frame based on the contrast control information output from the controlling unit, and
wherein the output resulting image signal comprises the one frame.

* * * * *